United States Patent [19]
Kaji

[11] Patent Number: 5,652,898
[45] Date of Patent: Jul. 29, 1997

[54] DICTIONARY MEMORY FOR TEXT PROCESSING USING WORD FREQUENCY AND WORD RECENCY OCCURRENCE INFORMATION

[75] Inventor: Hiroyuki Kaji, Tama, Japan

[73] Assignee: Hitachi, Ltd., Tokyo, Japan

[21] Appl. No.: 113,679

[22] Filed: Aug. 31, 1993

[30] Foreign Application Priority Data

Sep. 8, 1992 [JP] Japan .................................. 4-239257

[51] Int. Cl.⁶ .......................... G06F 17/20; G06F 17/28; G06F 3/14; G06F 17/21
[52] U.S. Cl. .......................... 395/760; 395/752; 395/794
[58] Field of Search .................. 364/419.01, 419.02, 364/419.11, 419.14, 419.13; 395/2.54, 2.53, 760, 752, 794

[56] References Cited

U.S. PATENT DOCUMENTS 5,227,971   7/1993   Nakajima et al. .
5,457,768   10/1995  Tsuboi et al. .

FOREIGN PATENT DOCUMENTS 63-132379   6/1988   Japan .
2-42572     2/1990   Japan .

*Primary Examiner*—Gail O. Hayes
*Assistant Examiner*—George N. Stevens
*Attorney, Agent, or Firm*—Fay, Sharpe, Beall, Fagan, Minnich & McKee

[57] ABSTRACT

A dictionary memory acquires knowledge of degrees of association between words. Word units are provided, each corresponding to a word and each storing word occurrence information, and these word units are connected by links in which the degree of association between words is stored, forming a network. The word units use word occurrence information to determine the degrees of activity of words, links determine word expectations based on the degrees of activity and degrees of association between words, and the word units determine likelihoods of words in input registers by adding the expectations thereto. Next, words selected by a maximum-likelihood word selecting part are placed in an output register by the corresponding word units. Links adjust degrees of association between words based on the likelihoods and degrees of activity of words.

9 Claims, 4 Drawing Sheets

*1) REPEAT p TIMES
  THE i-TH TIME IS EXECUTED TO THE TARGET
  OF i-TH INPUT REGISTER.

*2) REPEAT q TIMES
  THE i-TH TIME IS EXECUTED TO THE TARGET
  OF i-TH OUTPUT REGISTER.

5,652,898

DICTIONARY MEMORY FOR TEXT PROCESSING USING WORD FREQUENCY AND WORD RECENCY OCCURRENCE INFORMATION

BACKGROUND OF THE INVENTION

The present invention relates to a dictionary memory for natural language processing, and more particularly to a dictionary memory capable of storing and updating degrees of association between words and information on word occurrence in a text.

Meaningful natural-language text is made up of semantically related words. As such, the words that co-occur in a text are restricted. It is well known that this fact can be utilized to improve text processing accuracy. For example, a method in which a machine translation system utilizes word co-occurrence information to select an appropriate word in a target language is disclosed in JP-A-63-132379. The same concept is used in homophone selection in Kana-to-Kanji conversion, word recognition in speech recognition, correction of spelling errors in a text and the like. Text processing utilizing word co-occurrence information is realized by preparing a co-occurrence dictionary in which are stored pairs of words that may co-occur and, when there is a plurality of candidates for a particular word, checking to see whether the co-occurrence dictionary contains a pair of words consisting of each of the candidates and a word occurring near the word. A problem with this type of conventional method is that the wide context examination requires checking of many pairs of words, which increases the processing time.

With respect to the utilization of word co-occurrence information, another problem concerns how to acquire the knowledge of word co-occurrence. In this regard, JP-A-2-42572, for example, discloses a method of analyzing the syntax of a sentence and registering, in a co-occurrence dictionary, pairs of words having a dependency relationship. This method permits the knowledge of word co-occurrence to be acquired from a text automatically. However, inasmuch as the pairs of words that can be acquired by this method are restricted to words between which the strong relationship of dependency obtains, there is the additional condition of syntactical unambiguity, giving rise to the drawback of low efficiency of the knowledge acquisition process.

SUMMARY OF THE INVENTION

An object of the present invention is to provide a dictionary memory for natural language processing applications that enables high-speed text processing using the knowledge of word co-occurrence, and that improves the efficiency with which word co-occurrence knowledge is acquired.

For solving the aforesaid problems, an embodiment of the present invention includes a network formed of word units corresponding to each of the words of a natural language, and links connected with the word units. Input registers and Output registers for loading words and their likelihood of occurrence (hereinafter likelihood) are provided as an interface with a natural language processing system. The word units are provided with the word occurrence information storing unit for storing preceding context and succeeding context word occurrence information, a degree-of-activity determining unit for determining the degrees of activity of words based on the preceding context and a succeeding context word occurrence information, and likelihood determining unit for determining the likelihood of a word by revising an externally-provided tentative likelihood according to the expectation of the word occurrence (hereinafter expectation). The links are provided with a degree-of-association storing unit for storing the degree of association between words, an expectation determining unit for determining the expectation of a word from the degrees of activity of words and the degrees of association between words, and a degree-of-association adjusting unit for adjusting degrees of association between words based on degrees of activity of the words. Maximum-likelihood word selecting units, which are connected to all of the word units, obtain the maximum likelihood value output by the word units.

When the candidate words and the tentative likelihood of each word have been loaded into the input register, the above units perform the following operations. The degree-of-activity determining unit determines the degrees of activity of words at that point based on information stored in the word occurrence information storing unit. The expectation determining unit then determines the expectation of a word based on the degrees of activity of words and the degrees of association between words. The likelihood of a word is then determined by the likelihood determining unit based on the tentative likelihood and the expectation. The result of this process is received by the maximum-likelihood word selecting unit, which selects the word having the maximum likelihood (i.e., the word most likely to be correct). In this way, the preceding context and succeeding context word occurrence information are utilized to select the word having the maximum likelihood, which is placed on the output register. The degree of association between words is then adjusted by the degree-of-association adjusting unit based on the degrees of association of words. This is a process that strengthens the degree of association between a selected word and a word having a high degree of activity at that point, and accumulates knowledge on word co-occurrence into the degrees of association. Concerning the above operations, all of the word units operate in parallel, and all of the links also operate in parallel. This provides high-speed realization of both the maximum-likelihood word determination and degree-of-association acquisition.

DESCRIPTION OF THE PREFERRED EMBODIMENT

Figure 1:
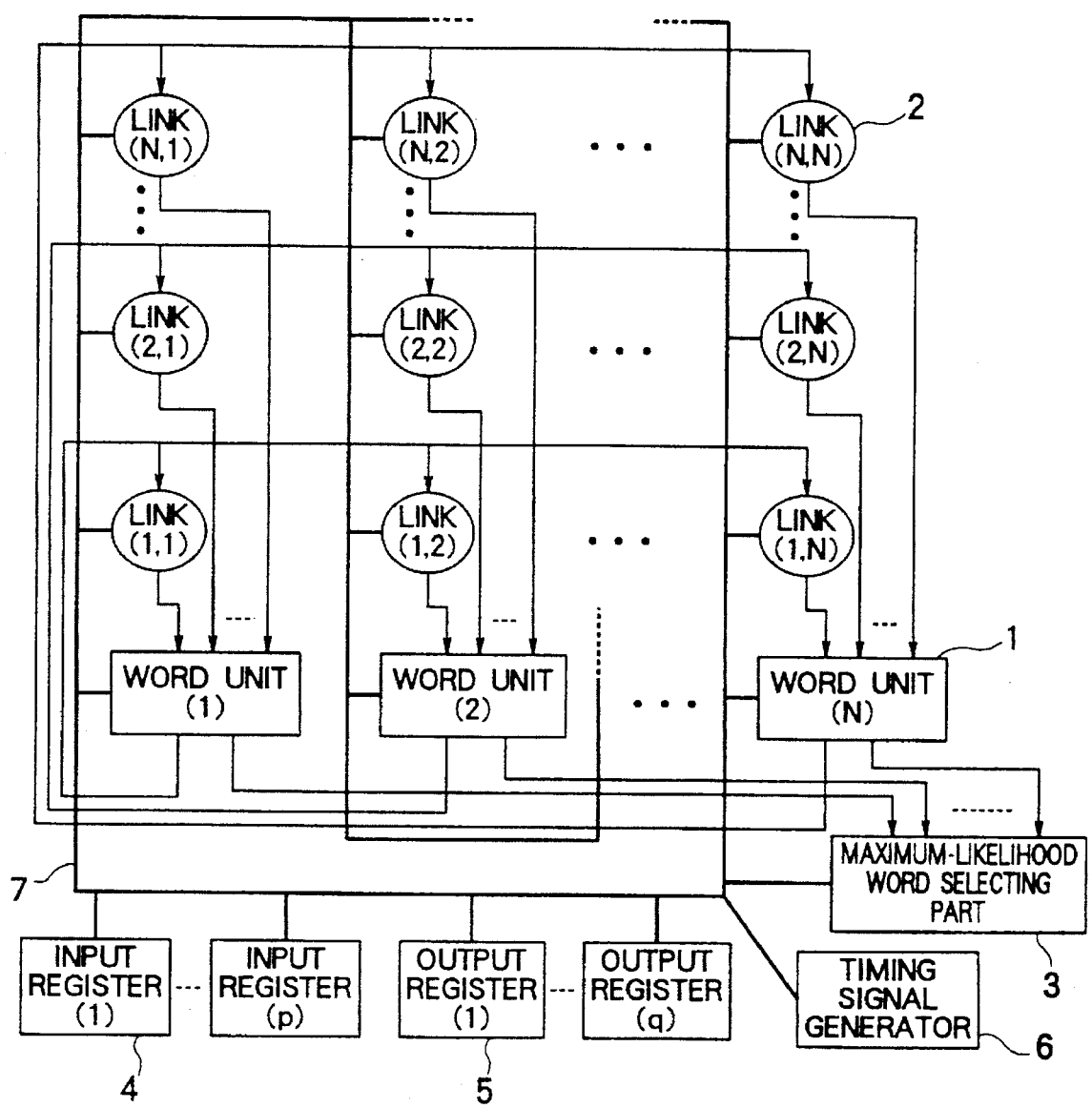
FIG. 1 is a diagram showing an overall arrangement of a dictionary memory.

A first embodiment of a dictionary memory according to the present invention will now be described. FIG. 1 shows an overall arrangement. The principal elements are word units 1 and links 2. The number of word units provided is equal to the number of words N of the target language, each word unit corresponding to one word. There are a total of (N, N) links. Arbitrary pairs of word units are connected by a link. One maximum-likelihood word selecting part 3 is provided that is connected to all of the word units. Other elements are input registers 4 shown as (p) and output registers 5 shown as (q), where (p) is the number of candidate words input to the dictionary memory and (q) is the number of words output from the dictionary memory. Values of (p) and (q) may be set according to the natural language processing system that uses the dictionary memory. Respective word units 1, links 2, maximum-likelihood word selecting part 3, input registers 4 and output registers 5, together with a timing signal generator 6, are connected to a common bus 7.

Figure 2:
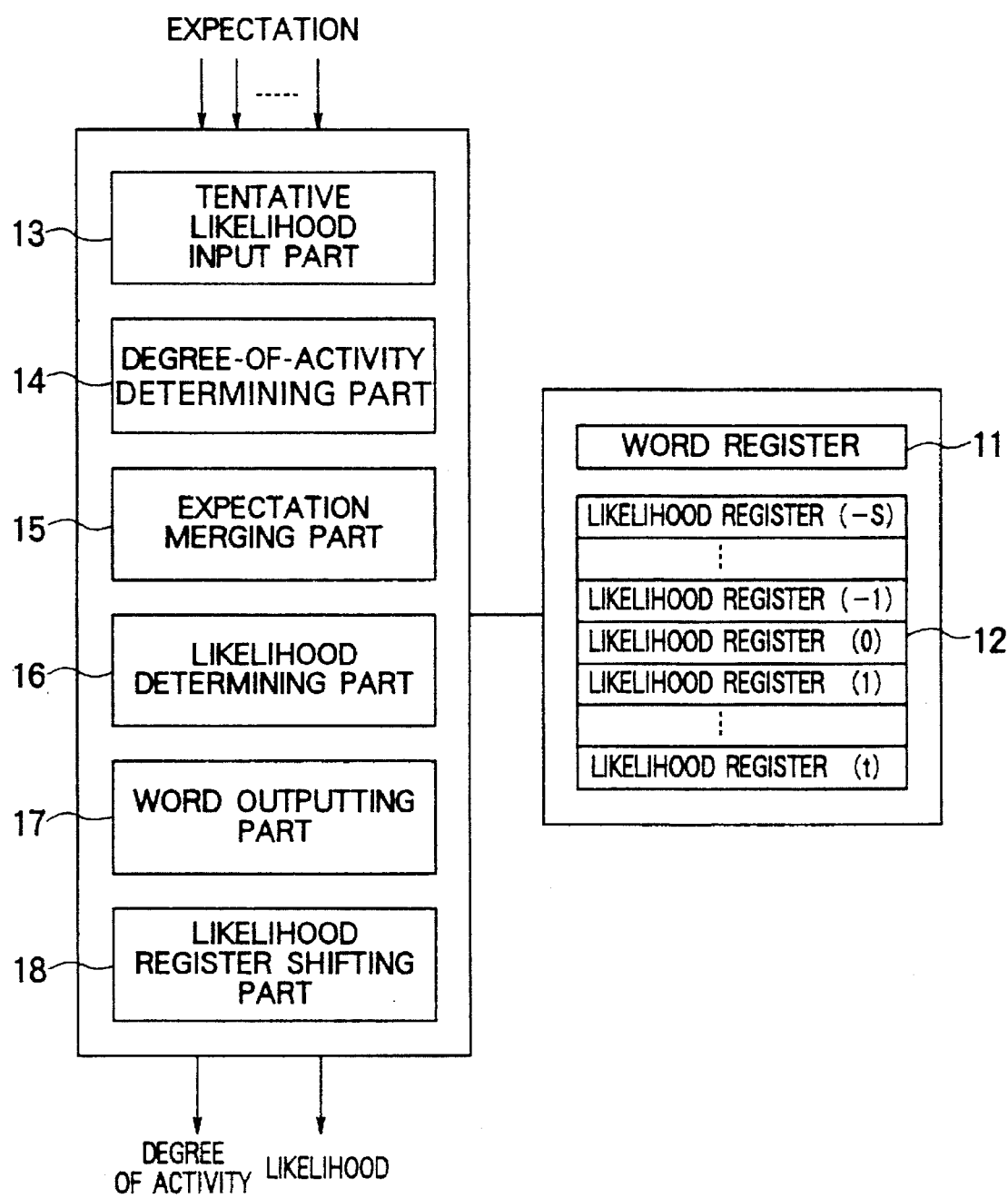
FIG. 2 is a diagram showing an arrangement of a word unit.

As shown in FIG. 2, a word unit 1 consists of a word register 11, (s+t+1) likelihood registers 12, a tentative likelihood input part 13, a degree-of-activity determining part 14, an expectation merging part 15, a likelihood determining part 16, a word outputting part 17 and a likelihood register shifting part 18. Here, (s) and (t) are parameters that indicate the extent of the preceding context and succeeding context utilized in the determination of word likelihood. The values of (s) and (t) may be set according to the natural language system using the dictionary memory. The i-th word unit will receive expectations input from total N of the (1, i)-th, (2, i)-th, ..., and (N, i)-th links. From the i-th word unit the likelihood output goes to the maximum-likelihood word selecting part and the degree-of-activity output goes to total N of the (i, 1)-th, (i, 2)-th, ..., and (i, N)-th links.

Figure 3:
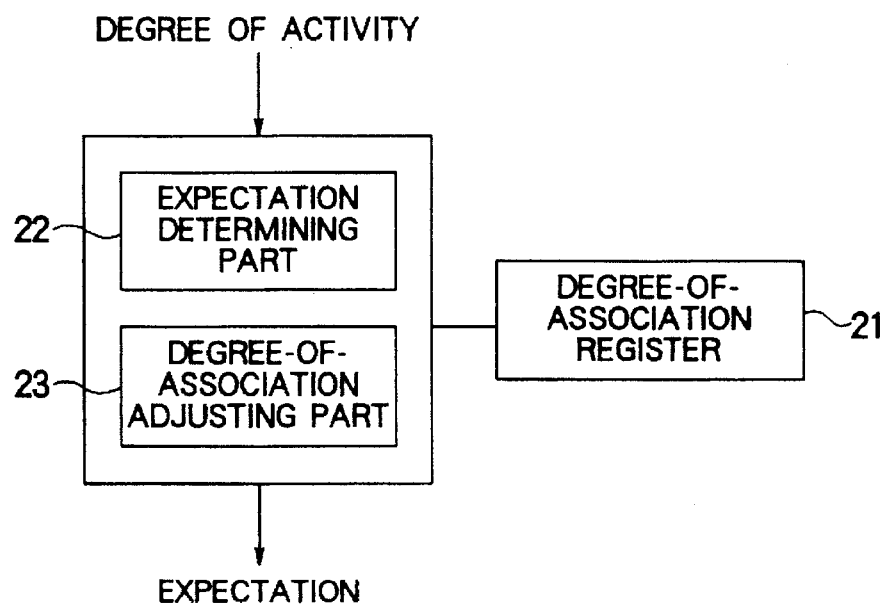
FIG. 3 is a diagram showing an arrangement of a link.

As shown in FIG. 3, a link 2 consists of a degree-of-association register 21, an expectation determining part 22 and a degree-of-association adjusting part 23. The (i, j)-th link will receive a degree-of-activity input from the i-th word unit, and the expectation from the (i, j)-th link is output to the j-th word unit.

Figure 4A:
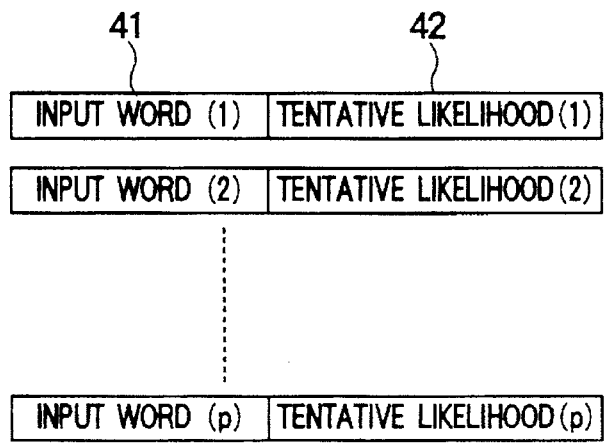
FIGS. 4A and 4B are diagrams showing arrangement of input and output registers.
Figure 4B:
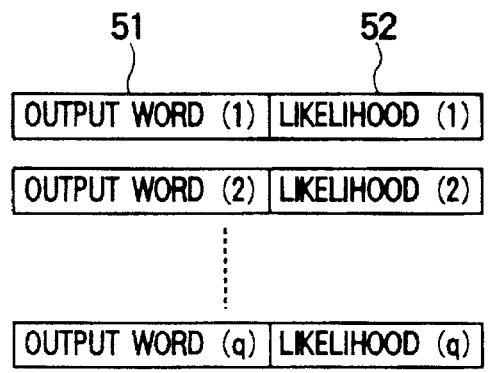

As shown in FIGS. 4A, 4B, the input register 4 shown in FIG. 4A is comprised of a section that loads an input word 41 and a section that loads the tentative likelihood 42 thereof. As shown in FIG. 4B, the output register 5 is similarly comprised of a section that loads an output word 51 and a section that loads the tentative likelihood 52 thereof.

Figure 5:
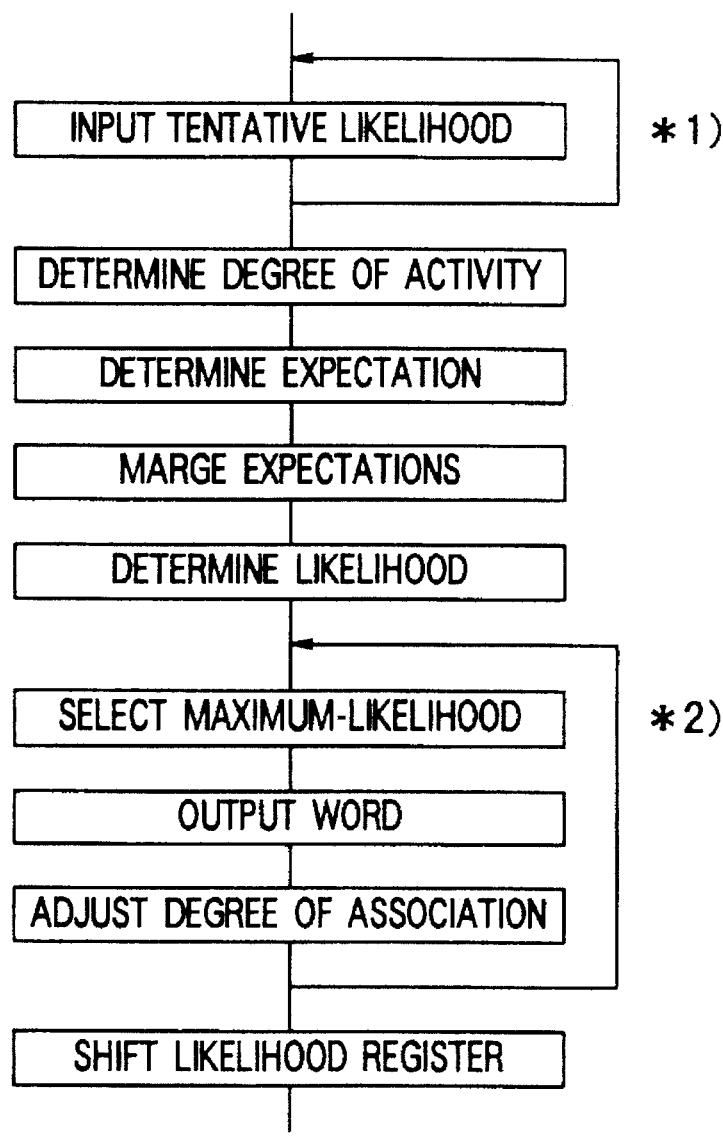
FIG. 5 is a diagram showing a sequence of one operating cycle.

The timing signal generator 6 controls the timing of data exchanges between the dictionary memory and the external system using the dictionary memory, and the operational timing of each part of the dictionary memory. When candidate words and the tentative likelihoods thereof are loaded into the input registers from an external source, the parts of the dictionary memory operate in the sequence shown in FIG. 5. External access to the input and output registers is prohibited during this operation. When one cycle of the operations shown in FIG. 5 is completed, the input and output registers become externally accessible. The external system can read words and likelihoods from the output register and restart the processing.

The operation of each part of the dictionary memory will now be described.

(1) Tentative likelihood input part 13

In one cycle, the tentative likelihood input part 13 operates (p) times. The i-th operation is as follows. The input word 41 in the i-th input register is read in and a comparison is made with word register 11. If they coincide, the tentative likelihood 42 in the i-th input register is read in and loaded into the (-s)-th likelihood register 12, and if they do not coincide, the tentative likelihood input part 13 does nothing.

As a special operation, when the input word 41 in the i-th input register is "9999", the values in all of the likelihood registers 12 from (-s)-th to t-th are zeroed. This is provided as a means of resetting word occurrence information in the dictionary memory.

(2) Degree-of-activity determining part 14

Based on preceding context word occurrence information and succeeding context word occurrence information (that is, on the values of the (-s)-th, ..., and (-1)-th, likelihood registers and the values of the 1st, ..., and t-th likelihood registers, respectively, the degree of activity is calculated and output to links. Degrees of activity can be calculated in various ways. In the present embodiment, degrees of activity are calculated using the following equation. Here, Pr(i) represents the value of the i-th likelihood register and d is a constant.

$$(1-(s-1)\cdot d)\cdot Pr(-s)$$
$$+(1-(s-2)\cdot d)\cdot Pr(-s+1)$$
$$\ldots$$
$$+(1-d)\cdot Pr(-2)$$
$$+Pr(-1)$$
$$+Pr(1)$$
$$+(1-d)\cdot Pr(2)$$
$$\ldots$$
$$+(1-(t-2)\cdot d)\cdot Pr(t-1)$$
$$+(1-(t-1)\cdot d)\cdot Pr(t)$$

This equation exhibits the influence on the degree of activity due to both the frequency of word occurrence (the degree increases as the number of terms (values) increases) and recency of word occurrence (values near the current position of the word of concern (i.e., small s or t) have greater weight in the degree determination), as determined by the degree-of-activity determining part 14.

(3) Expectation determining part 22

The expectation determining part 22 uses the degree of activity output by the input side word unit and the degree of association stored in the degree-of-association register 21 as a basis to calculate the expectation of the word corresponding to the output side word unit, and outputs the result to the word unit. Expectation can be calculated in various ways. In the present embodiment the product of the degree of activity and the degree of association is adopted as the expectation.

(4) Expectation merging part 15

The expectation merging part 15 merges the expectations from each of the input side links to obtain the expectation of the corresponding word of its own word unit, and outputs the expectation to the likelihood determining means. Expectations can be merged in various ways. In the present embodiment, of the expectations from the links, the one that has the maximum value is adopted.

(5) Likelihood determining part 16

Based on the expectation output by the expectation merging part 15, the likelihood determining part 16 revises the value of the 0-th likelihood register 12 And also outputs the revised likelihood to the maximum-likelihood word selecting part 3. Various methods can be used to revise the likelihood. In this embodiment, the product of the value of the 0-th likelihood register and the expectation is adopted as the new value of the 0-th likelihood register.

(6) Maximum-likelihood word selecting part 3

The maximum-likelihood word selecting part 3 determines the unit number of the word unit outputting the maximum likelihood, and sends the unit number to all word units and all links through the common bus 7.

(7) Word outputting part 17

In one cycle, the word operating part 17 operates q times. The i-th operation is as follows. The word outputting part 17 checks whether a unit number received from the maximum-likelihood word selecting part 3 is the unit number of its own word unit. If the unit number is its own word unit number, it outputs the value of the word register 11 and the value of the 0-th likelihood register 12 to the output word 51 and likelihood 52, respectively, of the i-th output register, and changes the output of the maximum-likelihood word selecting part 3 to 0. If the number is not its own word unit number, the word outputting part 17 does nothing.

(8) Degree-of-association adjusting part 23

In one cycle, the degree-of-association adjusting part 23 operates q times. The i-th operation is as follows. The degree-of-association adjusting part 23 checks whether a unit number received from the maximum-likelihood word selecting part 3 is the unit number of the word unit on the output side of its own link. If the unit number is the number of the word unit on the output side of its own link, it adjusts the degree of association based on the degree of activity output from the input side word unit, and the likelihood 52 of the i-th output register. Various methods can be used to compute the new value of the degree of association. In this embodiment, the new value used is that obtained by adding the degree-of-association value up to that point to the product of the degree of activity of the input side word unit and the likelihood of the output register.

(9) Likelihood register shifting part 18

The likelihood register shifting part 18 shifts the contents of the likelihood registers by shifting the value in the (t-1)-th likelihood register to the t-th likelihood register, the value in the (t-2)-th likelihood register to the (t-1)-th likelihood register, . . . , and the value in the (-s)-th likelihood register to the (-s+1)-th likelihood register. However, the value in the 0-th likelihood register is not shifted as-is to the 1st likelihood register; instead a value is loaded that has been normalized using the likelihood of the maximum-likelihood word as a reference. That is, (the value of the 0-th likelihood register)/(the value of the likelihood of the 1st output register) is loaded. The value of the (-s)-th likelihood register is zeroed.

As a result of the above operation of each part of the dictionary memory, the candidate words and their likelihoods are loaded into the output registers with a delay of s cycles after the candidate words and their tentative likelihoods are loaded into input registers.

The dictionary memory of the present invention can be utilized in various natural language processing systems. Some examples are as follows.

The first example is a speech recognition system. The results of phoneme recognition accomplished using voice signal processing and feature extraction are obtained in the form of a phoneme lattice. A phoneme lattice is converted to a word lattice by referring to a dictionary in which phonemic symbol strings form the entries. Attached to the words in the word lattice are likelihoods that are computed based on likelihoods attached to phonemes in the phoneme lattice. A speech recognition system inputs into the dictionary memory of this invention the words contained in a word lattice, and the likelihoods thereof, in a time sequence. The likelihoods of the words that are input are revised by the dictionary memory, based on degrees of association with preceding and succeeding words, and then output. After updating the likelihoods of the words in the word lattice in accordance with the output of the dictionary memory, the speech recognition system selects the maximum-likelihood word string from the word lattice.

In a second example, the dictionary memory is applied to lexical selection in a machine translation system. The source language analysis component of a machine translation system analyzes a source language sentence to obtain a source language intermediate expression. The elements of a source language intermediate expression are source language words. The transfer component of a machine translation system uses a bilingual dictionary and structural transfer rules to convert a source language intermediate expression to a target language intermediate expression. For each word in the source language, a bilingual dictionary usually lists a plurality of equivalent words in the target language. For each word in the source language intermediate expression, equivalent words in the target language are input one by one into the dictionary memory of this invention. A tentative likelihood of 1 may be input for all words. For each word in the source language intermediate expression, the dictionary memory outputs the likelihood of the equivalent words in the target language, one by one, and the transfer component of the machine translation system selects equivalent words that have a high likelihood. A target language intermediate expression is thereby obtained, and from this target language intermediate expression the target language generation component of the machine translation system generates a translation.

A third example relates to applying the dictionary memory to a disambiguation process used in syntactic analysis of a natural language sentence. For the dictionary memory thus utilized, it is assumed that $s=0$ and $t=1$. It is also assumed that the syntactic analysis program employs a method for finding all governor candidates for a word. Governor candidates for a word w are assumed to be $w1, w2, \ldots,$ and $wn$. The syntactic analysis program begins by inputting "9999" to the dictionary memory, inputs "w" in the next cycle, and "w1, w2, . . . , and wn" in the next cycle. In accordance with this procedure, the likelihoods of $w1, w2, \ldots,$ and $wn$ are determined with only w being in a high-degree-of-activity state, so words are output from $w1, w2, \ldots,$ and wn that have a high degree of association with w. The syntactic analysis program can use this outcome to determine the governor of w.

In accordance with the present invention, the knowledge of word co-occurrence can be acquired automatically from a text in the form of degrees of association between words, and the knowledge thus acquired can be utilized to perform high-speed disambiguation of words produced in the course of natural language processing.

I claim:

1. A dictionary memory comprises a network constituted by word units each of which corresponds to a word and has means for storing information on the frequency of occurrence and recency of occurrence of the corresponding word in a text, and links each of which corresponds to a pair of words and has means for storing the degree of association between the corresponding pair of words.

2. A dictionary memory, comprising:

means for storing a degree of association between words;

means for storing information on occurrence of words in a text; and means for determining a degree of activity of a word based on information on the frequency of occurrence and recency of occurrence of the words in the text.

3. A dictionary memory according to claim 2, wherein a word that occurred more recently is assigned a higher degree of activity.

4. A dictionary memory according to claim 2, wherein the degree of association between words represents a possibility that the words co-occur in a text, and wherein the dictionary memory includes means for adjusting the degree of association between a word that occurred in a text and another word based on the degree of activity of another word at that point.

5. A dictionary memory according to claim 2, wherein the dictionary memory includes means for determining likelihood for a word based on the degrees of association between words and the degrees of activity of words.

6. A dictionary memory according to claim 2, wherein the dictionary memory includes means for inputting words that are candidates for occurrence in a text, means for determining a likelihood for each candidate based on the degrees of association between words and the degrees of activity of words, and means for outputting the likelihood for each candidate.

7. A dictionary memory according to claim 2, wherein the dictionary memory includes means for inputting words that are candidates for occurrence in a text together with the respective likelihood thereof, means for revising the likelihood for each candidate based on the degrees of association between words and the degrees of activity of words, and means for outputting the revised likelihood for each candidate.

8. A dictionary memory according to claim 2, wherein the dictionary memory includes means for inputting words that are candidates for occurrence in a text, means for determining a likelihood for each candidate based on the degrees of association between words and the degrees of activity of words and selecting a word that has the maximum likelihood, and means for outputting the selected word that has the maximum likelihood.

9. A dictionary memory according to claim 2, wherein the dictionary memory includes means for inputting words that are candidates for occurrence in a text together with the respective likelihood thereof, means for revising the likelihood for each candidate based on the degrees of association between words and the degrees of activity of words and selecting a word that has the maximum likelihood, and means for outputting the selected word that has the maximum likelihood.

* * * * *